United States Patent
Kiryuu et al.

(10) Patent No.: US 11,493,611 B2
(45) Date of Patent: *Nov. 8, 2022

(54) LASER SCANNER

(71) Applicant: TOPCON Corporation, Tokyo-to (JP)

(72) Inventors: Noriyasu Kiryuu, Tokyo-to (JP); Taizo Eno, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 686 days.

This patent is subject to a terminal disclaimer.

(21) Appl. No.: 16/387,692

(22) Filed: Apr. 18, 2019

(65) Prior Publication Data

US 2019/0242977 A1   Aug. 8, 2019

Related U.S. Application Data

(63) Continuation of application No. 15/471,271, filed on Mar. 28, 2017, now Pat. No. 10,310,059.

(30) Foreign Application Priority Data

Mar. 31, 2016   (JP) ................................. 2016-072628

(51) Int. Cl.
| | |
|---|---|
| *G01S 7/484* | (2006.01) |
| *G01C 15/00* | (2006.01) |
| *G01S 17/42* | (2006.01) |

(Continued)

(52) U.S. Cl.
CPC .............. *G01S 7/484* (2013.01); *G01B 11/26* (2013.01); *G01C 15/002* (2013.01);
(Continued)

(58) Field of Classification Search
CPC .......... G01S 17/08; G01S 7/497; G01S 7/483; G01S 7/484; G01S 7/4814; G01S 7/4817;
(Continued)

(56) References Cited

U.S. PATENT DOCUMENTS

| | | | | |
|---|---|---|---|---|
| 10,310,059 B2* | 6/2019 | Kiryuu | ................... | G01S 17/42 |
| 2007/0104431 A1* | 5/2007 | Di Teodoro | ....... | G02B 6/02347 |
| | | | | 385/123 |

(Continued)

FOREIGN PATENT DOCUMENTS

| | | |
|---|---|---|
| EP | 2677340 A1 | 12/2013 |
| JP | 2008-82782 A | 4/2008 |

(Continued)

OTHER PUBLICATIONS

European communication dated Aug. 2, 2017 in corresponding European patent application No. 17163148.4.

*Primary Examiner* — Luke D Ratcliffe

(74) *Attorney, Agent, or Firm* — Nields, Lemack & Frame, LLC

(57) ABSTRACT

The invention provides a laser scanner, which comprises a light source unit, a light receiving unit, a distance measuring unit, an angle measuring unit, a telescope unit capable of rotating in a horizontal direction and a vertical direction, a rotation driving unit, a directional angle detector, and a control arithmetic unit, wherein the light source unit is an MOPA type and has an oscillator control circuit, a main oscillator, and an optical amplifier, wherein the oscillator control circuit has a repetition frequency setting component, a pulse peak output setting component, a pulse width setting component and an amplification factor calculating component and oscillates the main oscillator corresponding to a measured distance, and wherein the amplification factor calculating component calculates an amplification factor based on a repetition frequency, a pulse peak output, and a pulse width and amplifies the optical amplifier based on a calculated amplification factor.

4 Claims, 6 Drawing Sheets

(51) Int. Cl.
  *G01S 17/89* (2020.01)
  *G01S 7/481* (2006.01)
  *G01B 11/26* (2006.01)
  *G01S 7/4865* (2020.01)
  *G01S 17/10* (2020.01)

(52) U.S. Cl.
  CPC .......... *G01S 7/4814* (2013.01); *G01S 7/4817* (2013.01); *G01S 7/4818* (2013.01); *G01S 7/4865* (2013.01); *G01S 17/10* (2013.01); *G01S 17/42* (2013.01); *G01S 17/89* (2013.01)

(58) Field of Classification Search
  CPC ...... G01S 7/4818; G01S 7/4865; G01S 17/10; G01S 17/42; G01S 17/89; G01S 17/894; G01B 11/26; G01C 15/002
  See application file for complete search history.

(56) References Cited

U.S. PATENT DOCUMENTS

| | | |
|---|---|---|
| 2008/0074637 A1 | 3/2008 | Kumagai et al. |
| 2008/0151218 A1 | 6/2008 | Mack et al. |
| 2015/0138529 A1 | 5/2015 | Singer |
| 2015/0226853 A1* | 8/2015 | Seo .................. G01S 17/10 356/4.01 |
| 2016/0356890 A1 | 12/2016 | Fried et al. |
| 2017/0285144 A1 | 10/2017 | Kiryuu et al. |

FOREIGN PATENT DOCUMENTS

| | | |
|---|---|---|
| WO | 2010/149219 A1 | 12/2010 |
| WO | 2013/107709 A1 | 7/2013 |

* cited by examiner

LASER SCANNER

This application is a continuation of U.S. patent application Ser. No. 15/471,271 filed Mar. 28, 2017, the disclosure of which is incorporated herein by reference in its entirety.

BACKGROUND OF THE INVENTION

The present invention relates to a laser scanner for rotatably irradiating a pulsed distance measuring light and for acquiring three-dimensional point cloud data.

Of laser surveying instruments which emit a laser beam, receive a reflected light from an object to be measured, and performs a distance measurement, there is a TOF (Time of Flight) type surveying instrument which emits a pulsed light as a distance measuring light, obtains a reciprocating time of the pulsed light, and measures a distance.

In such a surveying instrument, a measurement range is scanned while continuously emitting the pulsed light. Further, by performing a distance measurement and an angle measurement for each pulsed light, three-dimensional point cloud data can be acquired.

Further, in order to guarantee a reliability of a measurement and a stability of the measurement, measurement conditions, for instance, a quality of the pulsed light required according to a distance to be measured needs to be satisfied. Further, the quality for each pulsed light requires to be stable.

Conventionally, a laser light source has been selected so that a pulse quality meeting a condition where a surveying instrument is used can be obtained. Further, a light emitting condition of the laser light source is set so that the pulsed light having a pulse width, a pulse repetition frequency and a pulse peak output has been emitted.

For this reason, in a case where measurements with different measurement conditions are performed, for instance, in a long distance measurement and a short distance measurement, since the same light emitting condition of the laser light source is not compatible with both the long distance measurement and the short distance measurement, a surveying instrument for a long distance and a surveying instrument for a short distance must be prepared, and facility costs increase. Further, in the long distance measurement and the short distance measurement, there is a need to prepare different surveying instruments, or the like, and hence a workability is poor.

SUMMARY OF THE INVENTION

It is an object of the present invention to provide a laser scanner which has a flexibility in selecting a pulse quality of a laser light source, enlarges a measurement range by one surveying instrument, and is improved in facility costs and a convenience of a measurement operation.

To attain the object as described above, a laser scanner according to the present invention comprises a light source unit for emitting a pulsed laser as a distance measuring light, a light receiving unit for receiving a reflected distance measuring light, a distance measuring unit for performing a distance measurement based on a signal from the light receiving unit, an angle measuring unit for performing an angle measurement based on a detection result of a directional angle detector which detects an emitting direction of the distance measuring light, a telescope unit which includes the light source unit, the light receiving unit, and the distance measuring unit and is capable of rotating in a horizontal direction and a vertical direction, a rotation driving unit for rotating the telescope unit, the directional angle detector for detecting a directional angle of the pulsed laser, and a control arithmetic unit for rotatably irradiating the pulsed laser in a necessary range and for preparing three-dimensional point cloud data based on a distance measurement result and a detection result of the directional angle for each pulsed laser, wherein the light source unit is designed as an MOPA type laser light source and has an oscillator control circuit, a main oscillator, and an optical amplifier, wherein the oscillator control circuit has a repetition frequency setting component, a pulse peak output setting component, a pulse width setting component and an amplification factor calculating component and oscillates the main oscillator by a repetition frequency, a pulse peak output, and a pulse width corresponding to a distance to be measured, and wherein the amplification factor calculating component calculates an amplification factor based on the repetition frequency, the pulse peak output, and the pulse width and amplifies the optical amplifier based on a calculated amplification factor.

Further, in the laser scanner according to the present invention, the optical amplifier has a plurality of sub-optical amplifiers and amplifies an optical pulse outputted from the main oscillator in a plurality of stages.

Further, in the laser scanner according to the present invention, the optical amplifier includes a rare earth-added optical fiber as an optical amplifying element.

Further, in the laser scanner according to the present invention, the optical amplifier includes a laser crystal as an optical amplifying element.

Furthermore, in the laser scanner according to the present invention, the oscillator control circuit comprises a measurement mode setting component for setting a measurement mode corresponding to a distance, the oscillator control circuit oscillates the main oscillator by the repetition frequency, the pulse peak output, and the pulse width corresponding to a set measurement mode and amplifies the optical amplifier by the amplification factor corresponding to the set measurement mode.

According to the present invention, the laser scanner comprises a light source unit for emitting a pulsed laser as a distance measuring light, a light receiving unit for receiving a reflected distance measuring light, a distance measuring unit for performing a distance measurement based on a signal from the light receiving unit, an angle measuring unit for performing an angle measurement based on a detection result of a directional angle detector which detects an emitting direction of the distance measuring light, a telescope unit which includes the light source unit, the light receiving unit, and the distance measuring unit and is capable of rotating in a horizontal direction and a vertical direction, a rotation driving unit for rotating the telescope unit, the directional angle detector for detecting a directional angle of the pulsed laser, and a control arithmetic unit for rotatably irradiating the pulsed laser in a necessary range and for preparing three-dimensional point cloud data based on a distance measurement result and a detection result of the directional angle for each pulsed laser, wherein the light source unit is designed as an MOPA type laser light source and has an oscillator control circuit, a main oscillator, and an optical amplifier, wherein the oscillator control circuit has a repetition frequency setting component, a pulse peak output setting component, a pulse width setting component and an amplification factor calculating component and oscillates the main oscillator by a repetition frequency, a pulse peak output, and a pulse width corresponding to a distance to be measured, and wherein the amplification factor calculating component calculates an amplification factor based on the repetition frequency, the pulse peak output, and the pulse width and amplifies the optical amplifier based on a calculated amplification factor. As a result, the flexibility in selecting the pulse quality of the laser light source is produced, the measurement range by one surveying instrument can be enlarged, and the facility costs and the convenience of the measurement operation can be improved.

BRIEF DESCRIPTION OF THE DRAWINGS

FIG. 5A shows the long distance measurement mode, and FIG. 5B shows the short distance measurement mode.

DETAILED DESCRIPTION OF THE PREFERRED EMBODIMENT

A description will be given below on an embodiment of the present invention by referring to the attached drawings.

Figure 1:
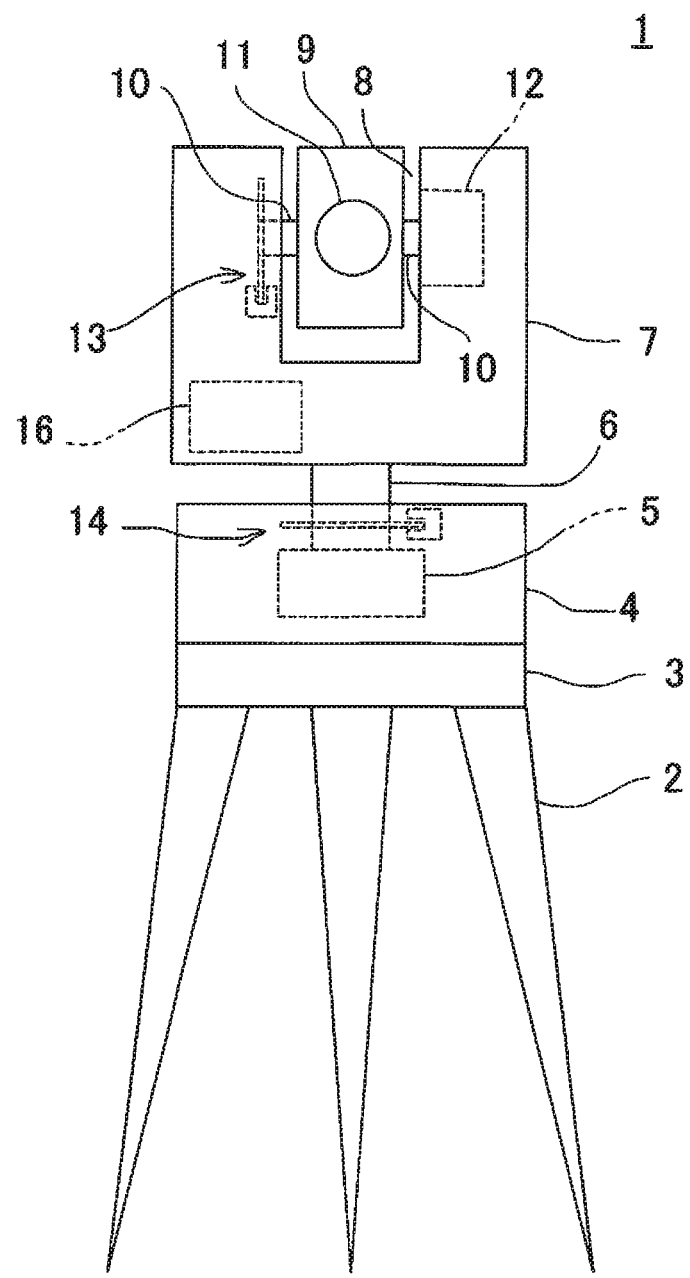
FIG. 1 is a schematical drawing of a laser scanner according to an embodiment of the present invention.

Referring to FIG. 1, a description will be given on an outline of a laser scanner 1.

A leveling unit 3 is provided on a tripod 2, and a base unit 4 is provided on the leveling unit 3. A horizontal rotation driving unit 5 is accommodated in the base unit 4. The horizontal rotation driving unit 5 has a horizontal rotation shaft 6 extending vertically, and a frame unit 7 which is a horizontal rotation unit is provided on an upper end of the horizontal rotation shaft 6.

The frame unit 7 has a recessed portion 8, and a telescope unit 9 which is a vertical rotation unit is accommodated in the recessed portion 8. The telescope unit 9 is rotatably supported by the frame unit 7 via a vertical rotation shaft 10. A telescope 11 with a distance measuring optical axis is provided in the telescope unit 9, and further a distance measuring unit 22 (see FIG. 2) is accommodated in the telescope unit 9.

A vertical rotation driving unit 12 is accommodated in the frame unit 7, and the vertical rotation driving unit 12 is coupled with the vertical rotation shaft 10. The telescope unit 9 is designed so as to rotate over total circumference by the vertical rotation driving unit 12. A vertical angle detector 13 is provided on the vertical rotation shaft 10. By the vertical angle detector 13, a rotation angle of the vertical rotation shaft 10 is detected, and further a vertical angle of the vertical rotation shaft 10 is detected.

The horizontal rotation driving unit 5 is coupled with the horizontal rotation shaft 6, and the frame unit 7 is designed so as to rotate over the total circumference by the horizontal rotation driving unit 5. Further, a horizontal angle detector 14 is provided on the horizontal rotation shaft 6. By the horizontal angle detector 14, a rotation angle of the frame unit 7 is detected, and further a horizontal angle of the frame unit 7 is detected.

Thus, the telescope unit 9 is rotated in a condition as required by a rotation driving unit comprised of the horizontal rotation driving unit 5 and the vertical rotation driving unit 12. Further, a directional angle of the telescope unit 9 is detected in real time by a directional angle detector comprised of the vertical angle detector 13 and the horizontal angle detector 14.

Figure 2:
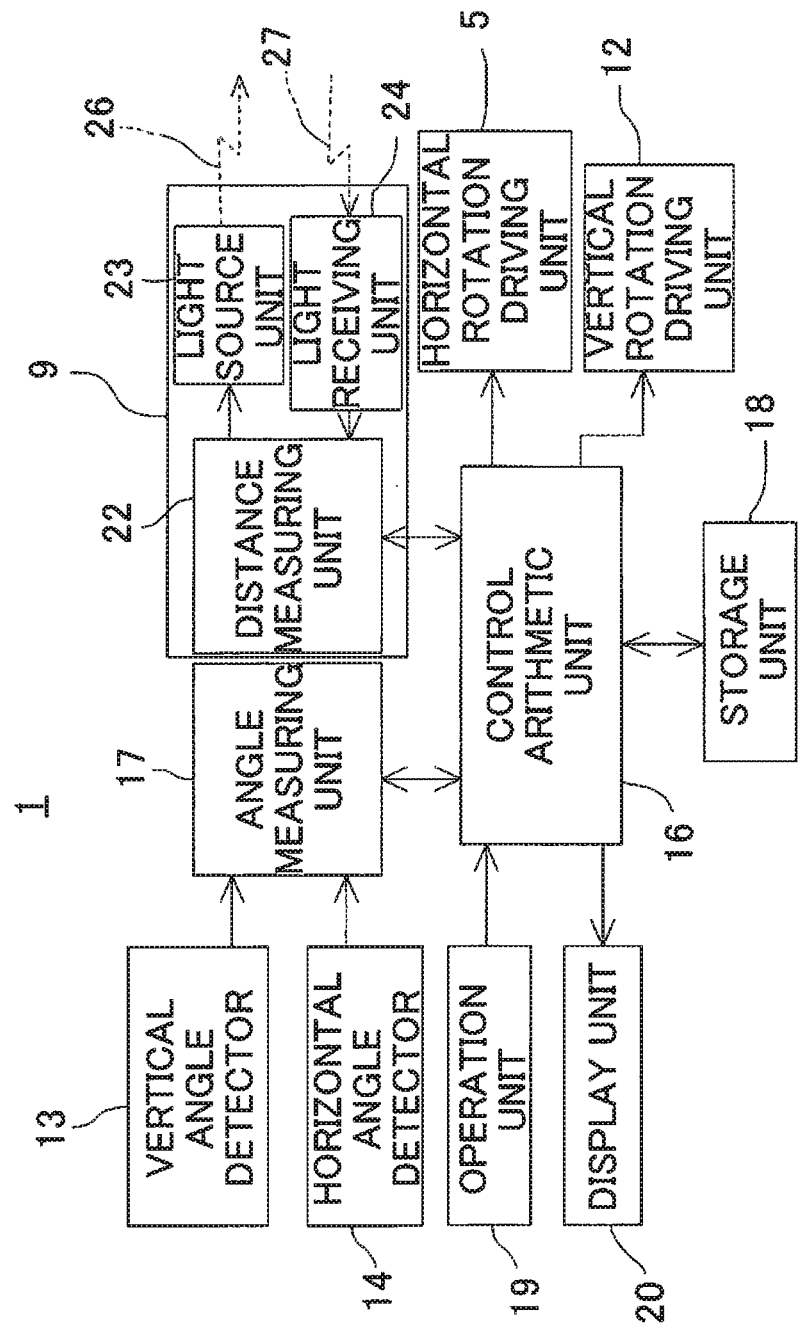
FIG. 2 is a schematical block diagram of the laser scanner.

Referring to FIG. 2, a description will be given on an approximate arrangement of the laser scanner 1. It is to be noted that, in FIG. 2, an optical system such as the telescope 11 and the like is not shown in the figure.

In FIG. 2, reference numeral 16 denotes a control arithmetic unit, reference numeral 17 denotes an angle measuring unit, reference numeral 18 denotes a storage unit, reference numeral 19 denotes an operation unit, and reference numeral 20 denotes a display unit.

The telescope unit 9 includes the distance measuring unit 22, a light source unit 23 for emitting a distance measuring light 26, and a light receiving unit 24 for receiving a reflected distance measuring light 27. The distance measuring unit 22 controls a light emission of the light source unit 23 and performs a distance measurement on a measuring point based on a light receiving signal issued from the light receiving unit 24. Further, the angle measuring unit 17 can perform a prism measurement in which an object to be measured is a retro-reflector (for instance, a prism) or a non-prism measurement in which the object to be measured is a natural object. Further, the distance measuring unit 22 makes the light source unit 23 emit a pulsed light and performs the distance measurement for each one pulse.

A vertical angle detection signal from the vertical angle detector 13 is inputted to the angle measuring unit 17, and the angle measuring unit 17 calculates a vertical angle based on the vertical angle detection signal. Further, a horizontal angle detection signal from the horizontal angle detector 14 is inputted to the angle measuring unit 17, and the angle measuring unit 17 calculates a horizontal angle based on the horizontal angle detection signal. The vertical angle and the horizontal angle are obtained for each distance measurement by the pulsed light of the distance measuring unit 22, and the directional angle for each measuring point with reference to the laser scanner 1 is obtained based on the vertical angle and the horizontal angle.

The control arithmetic unit 16 vertically rotates the telescope unit 9 over the total circumference in a vertical direction at a predetermined speed in the form of constant-speed rotation by the vertical rotation driving unit 12. Further, by the horizontal rotation driving unit 5, the control arithmetic unit 16 makes the telescope unit 9 synchronize to a rotation over the total circumference by the vertical rotation driving unit 12 and rotates the frame unit 7 in a horizontal direction at the predetermined speed. A laser scanning in a necessary range is carried out by rotations of the telescope unit 9 and the frame unit 7, and three-dimensional point cloud data in the necessary range can be acquired. Further, the control arithmetic unit 16 can set a measuring pitch (an interval between the measuring points) by setting a scanning speed and a pulse repetition frequency of a pulse emission.

In the storage unit 18, various types of programs for operating the laser scanner 1 are stored. For instance, these programs include: a measurement program for executing the distance measurement and the angle measurement, a driving control program for controlling drivings of the horizontal rotation driving unit 5 and the vertical rotation driving unit 12, a light emission control program for controlling the light emission of the light source unit 23, a measuring pitch setting program for setting the measuring pitch, a display program for displaying various kinds of information in the display unit 20, and other programs.

Further, a data storage area for storing measurement data is provided in the storage unit 18.

From the operation unit 19, measurement conditions such as a measurement range, a measurement density, and the like are inputted, or commands such as a measurement start, a measurement stop, and the like are inputted.

In the display unit 20, the measurement conditions such as the measurement range and the like and a measuring state are displayed, or measurement results and the like are displayed.

The light source unit 23 includes control circuits such as a circuit for switching between a long distance measurement mode and a short distance measurement mode, a circuit capable of adjusting pulse characteristics, a circuit for adjusting a pump power output of a laser light source for pumping, a circuit for controlling the pulse repetition frequency and the measuring pitch, and the like. When the light emission control program is executed, a light emitting condition of an optical pulse by the light source unit 23 is controlled by operations of the circuits as described above.

It is to be noted that a distance to be measured in the long distance measurement mode is, for instance, 20 m to 500 m, and a distance to be measured in the short distance measurement mode is, for instance, 0.2 m to 30 m. Further, as a measurement mode, a middle distance measurement mode may be set besides the long distance measurement mode and the short distance measurement mode.

In the laser scanner 1 according to the present embodiment, an MOPA (Master Oscillator Power Amplifier) type laser light source is used as the light source unit 23.

The MOPA type laser light source can be separated into a main oscillator for generating a pump light (for instance, a laser diode: an LD) and an optical amplifier, and each can be independently controlled. Therefore, the MOPA type laser light source can arbitrarily change the pulse width, the pulse repetition frequency, and the pulse peak output and emit a pulsed light with high quality and with high stability.

Figure 3:
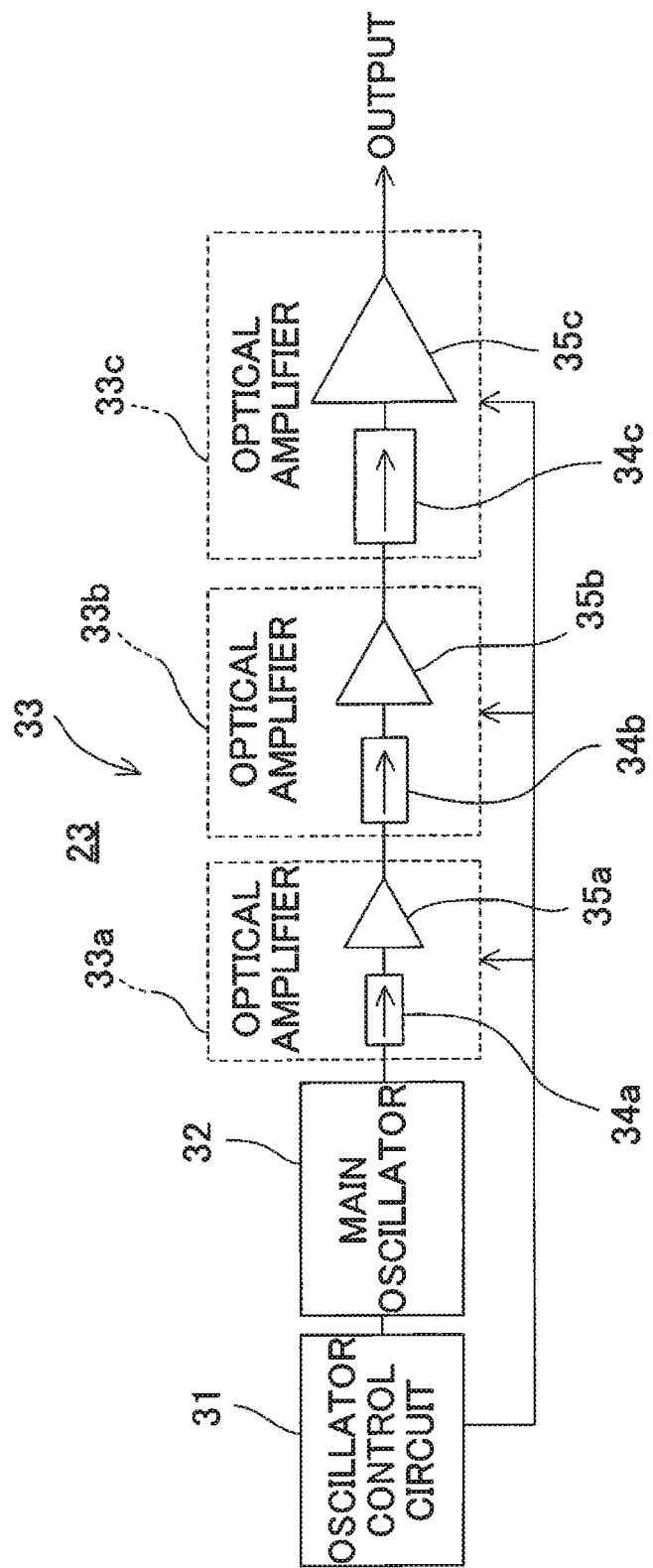
FIG. 3 is a schematical block diagram of an optical amplifier used in the present embodiment.

Referring to FIG. 3, a description will be given on an approximate arrangement of the MOPA type laser light source (hereinafter, referred as a light source unit 23).

An oscillator control circuit 31 applies an excitation signal to a main oscillator 32 and makes the main oscillator 32 oscillate a laser beam. The pulsed light is emitted from the main oscillator 32, and the pulsed light is amplified into a pulsed laser light corresponding to the distance to be measured by an optical amplifier 33 and is outputted.

The optical amplifier 33 shown in FIG. 3 has sub-optical amplifiers 33a, 33b, and 33c with three stages and is designed so as to amplify the pulsed light in three stages. It is to be noted that, in FIG. 3, reference numerals 34a, 34b, and 34c denote isolators for preventing an oscillation caused by a reflection of a laser in the optical amplifier respectively, and reference numerals 35a, 35b, and 35c denote optical amplifying elements, respectively.

In general, the main oscillator 32 tends to have a poor beam quality as an output increases and have a good beam quality as the output lowers. Further, the main oscillator 32 has characteristics that the beam quality is not deteriorated even after an amplification. Therefore, when the main oscillator 32 with low output and high quality is selected and the pulsed light is amplified by the optical amplifier 33, a pulsed laser with high output and with good beam quality can be obtained. Further, since the optical amplifier 33 is comprised of the sub-optical amplifiers 33a, 33b, and 33c with a plurality of stages and the pulsed light is amplified in the plurality of stages (three stages), the pulsed laser with high output can be easily obtained.

It is to be noted that the number of stages where the pulsed light is amplified is not limited to three, and it would suffice if the number of stages is selected corresponding to a required beam output, e.g., two, four, or the like.

Figure 4:
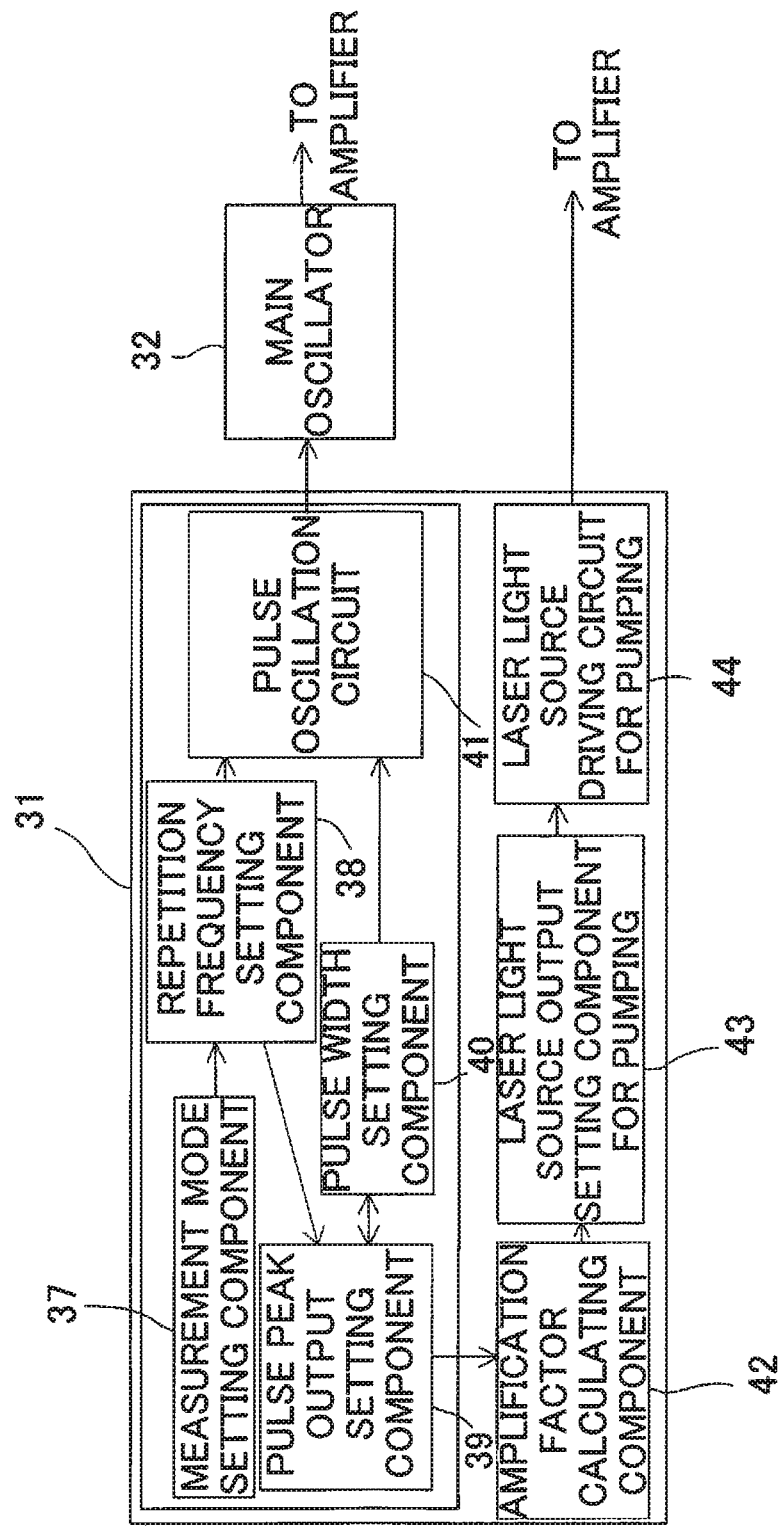
FIG. 4 is a schematical block diagram of one example of an oscillator control circuit of the optical amplifier.

FIG. 4 shows an approximate arrangement of the oscillator control circuit 31.

The oscillator control circuit 31 includes a measurement mode setting component 37, a repetition frequency setting component 38 for setting a repetition frequency of the pulsed laser, a pulse peak output setting component 39 for setting a peak output of the pulsed laser, a pulse width setting component 40 for setting a pulse width of the pulsed laser, and a pulse oscillation circuit 41, and further includes an amplification factor calculating component 42, a laser light source output setting component for pumping 43, and a laser light source driving circuit for pumping 44.

The measurement mode setting component 37 sets the long distance measurement mode or the short distance measurement mode corresponding to a distance to the measuring point or the object to be measured. When the measurement mode is set, the repetition frequency is set. Further, the measuring pitch is set simultaneously with a setting of the measurement mode. The repetition frequency is inputted to the control arithmetic unit 16, and the control arithmetic unit 16 controls the scanning speed so that the measuring pitch is set at a measuring pitch as set based on the repetition frequency.

It is to be noted that an appropriate pulse emitting condition is set, a preliminary measurement of the distance to the object to be measured is performed based on the settings, an approximate measurement is performed, and the measurement mode is set based on an approximate measurement value. Alternatively, in a case where a rough distance to the object to be measured is known, the measurement mode is set based on the distance.

The repetition frequency is inputted from the repetition frequency setting component 38 to the pulse peak output setting component 39 and the pulse oscillation circuit 41. The pulse oscillation circuit 41 generates a pulse signal corresponding to the repetition frequency and outputs the pulse signal to the main oscillator 32.

Further, the pulse peak output setting component 39 sets a pulse peak output value so that the pulse peak output value is in a range which corresponds to the repetition frequency and the pulse width and does not exceed a load factor of the oscillator control circuit 31.

The pulse peak output value is inputted to the amplification factor calculating component 42. In the amplification factor calculating component 42, an amplification factor with respect to the pulsed light outputted from the pulse oscillation circuit 41 is calculated, and the amplification factor is inputted to the laser light source output setting component for pumping 43. The laser light source output setting component for pumping 43 calculates an output (an intensity) of a laser for pumping which is entered the light amplifier 33, so as to be able to obtain the amplification factor. The laser light source driving circuit for pumping 44 makes a laser light source for pumping (not shown) emit so that the laser light source for pumping is set at the output of the laser for pumping as calculated.

In the oscillator control circuit 31, by selecting the short distance measurement mode or the long distance measurement mode, a pulse emitting condition can be changed so as to correspond to the distance to be measured.

First, the repetition frequency and the measuring pitch of the pulse emission are set so as to correspond to the short distance measurement mode or the long distance measurement mode. In a TOF type distance measurement, since the distance measurement is performed based on a reciprocating time of the pulsed light, a time of an emission interval of the pulsed light needs to be longer than the reciprocating time of the pulsed light.

Figure 5A:
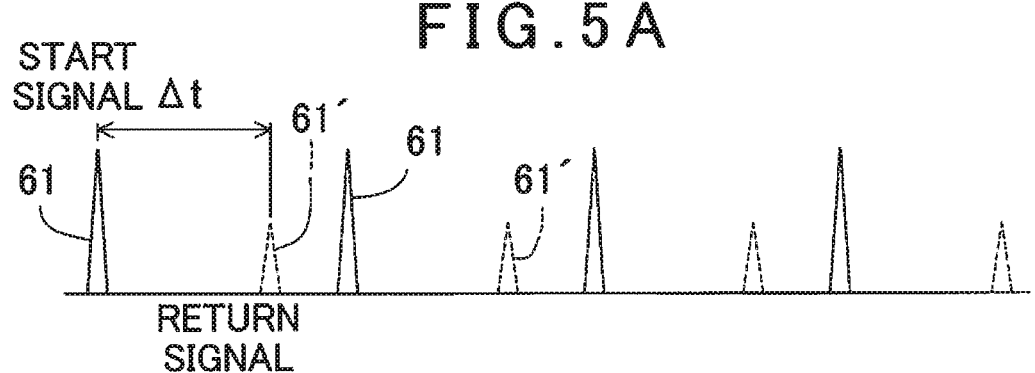
FIG. 5A and FIG. 5B are explanatory drawings to show a relation between a distance measuring light and a reflected distance measuring light in a case where a pulsed laser is adjusted to a long distance measurement mode and a short distance measurement mode by the optical amplifier.

FIG. 5A shows a relation between an emitted pulsed light (a distance measuring light) 61 and a reflected pulsed light (a reflected distance measuring light) 61' in case of performing the long distance measurement. The emission interval of the pulsed light is set to be longer than a reciprocating time Δt of the pulsed light.

Further, since an attenuation of the reflected pulsed light 61' in a long distance is considerable, in order to make a light receiving amount in the light receiving unit 24 appropriate, a pulse peak value needs to be increased. The pulse peak output setting component 39 sets the pulse peak output so as to make the light receiving amount in the light receiving unit 24 appropriate. Further, since the light receiving amount is also changed by the pulse width, by setting the pulse width, the light receiving amount is made to be appropriate. It is to be noted that the repetition frequency, the pulse peak output, and the pulse width are set so as not to exceed a limit of the load factor of the main oscillator 32.

Further, for safety, a maximum value of the pulse peak output is limited. Therefore, the pulse peak output as set by the pulse peak output setting component 39 is set so that an intensity of the pulsed laser after being amplified by the laser light source output setting component for pumping 43 and the laser light source driving circuit for pumping 44 does not exceed the maximum value.

Figure 5B:
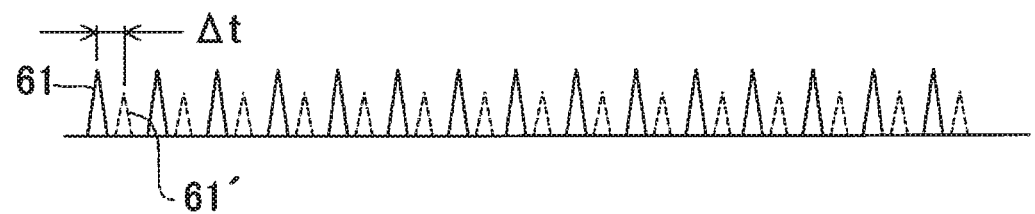

FIG. 5B shows a relation between the emitted pulsed light (the distance measuring light) 61 and the reflected pulsed light (the reflected distance measuring light) 61' in case of performing the short distance measurement. In the short distance measurement, since the reciprocating time of the pulsed light Δt is short, the emission interval of the pulsed light is set to be short.

Further, since the attenuation of the reflected pulsed light 61' in a short distance is small, even if the pulse peak output value is small, an appropriate light amount can be received by the light receiving unit 24. That is, the repetition frequency is set to be large, and the pulse peak output value is set to be small.

FIG. 6 to FIG. 9 show configuration examples of an MOPA type laser light source, respectively.

Figure 6:
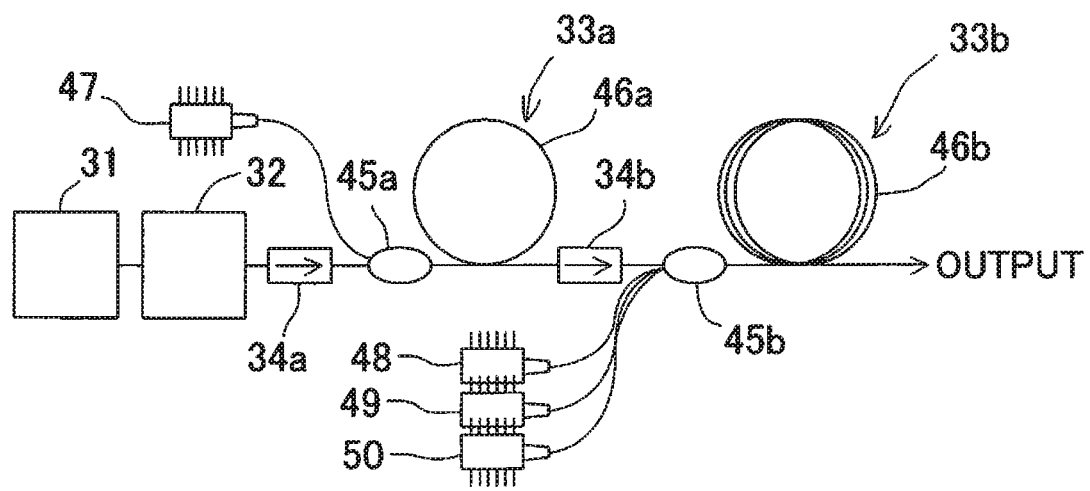
FIG. 6 is an explanatory drawing to show an MOPA type laser light source of a first example used in the present embodiment.

FIG. 6 shows a first example. An optical amplifier 33 has sub-optical amplifiers 33a and 33b. Further, as to the sub-optical amplifiers 33a and 33b, rare earth-added optical fibers 46a and 46b are used as optical amplifying elements, and two-stage amplifications are performed. Further, in FIG. 6, reference numerals 45a and 45b denote WDM (Wavelength Division Multiplexing) couplers as optical path coupling components. Further, reference numerals 47 to 50 denote laser light sources for pumping.

The first example shows a configuration in which a pump light is entered the optical fiber 46a (the sub-optical amplifier 33a) from one laser light source for pumping 47 through the WDM coupler 45a and pump lights are entered the optical fiber 46b (the sub-optical amplifier 33b) from three laser light sources for pumping 48, 49, and 50 through the WDM coupler 45b.

Figure 7:
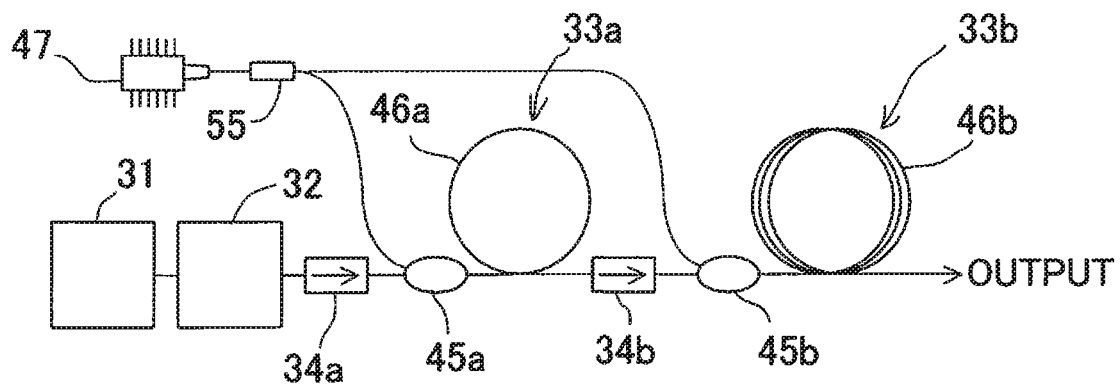
FIG. 7 is an explanatory drawing to show an MOPA type laser light source of a second example used in the present embodiment.

FIG. 7 shows a second example. In a manner similar to the first example, as optical amplifying elements of sub-optical amplifiers 33a and 33b, rare earth-added optical fibers 46a and 46b are used, and two-stage amplifications are performed. The second example shows a case where one laser light source for pumping 47 is used.

The second example shows a configuration in which a pump light emitted from the laser light source for pumping 47 is divided to, for instance, 1:3 by a beam splitter 55, the pump light with a ¼ light amount enters the optical fiber 46a (the sub-optical amplifier 33a) through a WDM coupler 45a, and the pump light with a ¾ light amount enters the optical fiber 46b (the sub-optical fiber 33b) through a WDM coupler 45b.

Figure 8:
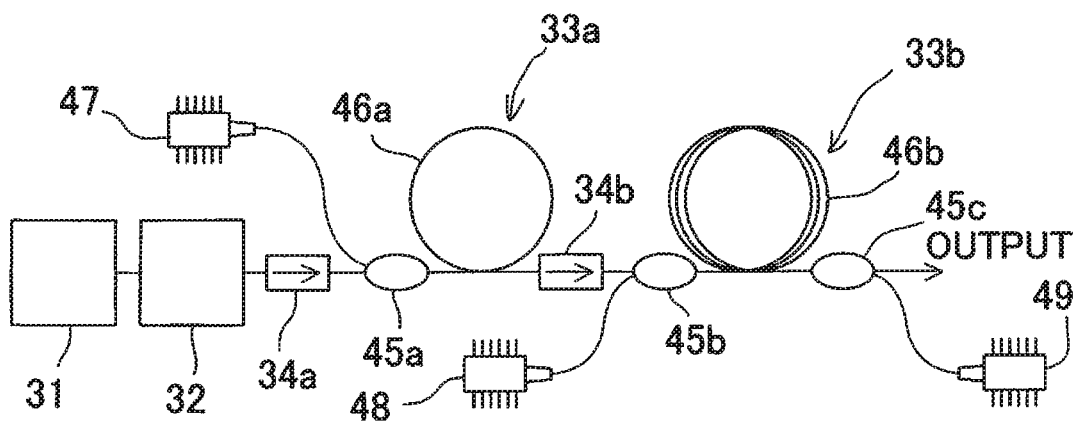
FIG. 8 is an explanatory drawing to show an MOPA type laser light source of a third example used in the present embodiment.

FIG. 8 shows a third example. In a manner similar to the first example, as optical amplifying elements of sub-optical amplifiers 33a and 33b, rare earth-added optical fibers 46a and 46b are used, and the two-stage amplifications are performed. In the third example, a main amplifier (the optical fiber 46b (the sub-optical amplifier 33b)) is designed as a bidirectional pump type.

The third example shows a configuration in which a pump light emitted from a laser light source for pumping 47 is entered the optical fiber 46a (the sub-optical amplifier 33a) through a WDM coupler 45a, a pump light emitted from a laser light source for pumping 48 is entered the optical fiber 46b (the sub-optical amplifier 33b) through a WDM coupler 45b, and a pump light emitted from a laser light source for pumping 49 is entered the optical fiber 46b through a WDM coupler 45c.

Figure 9:
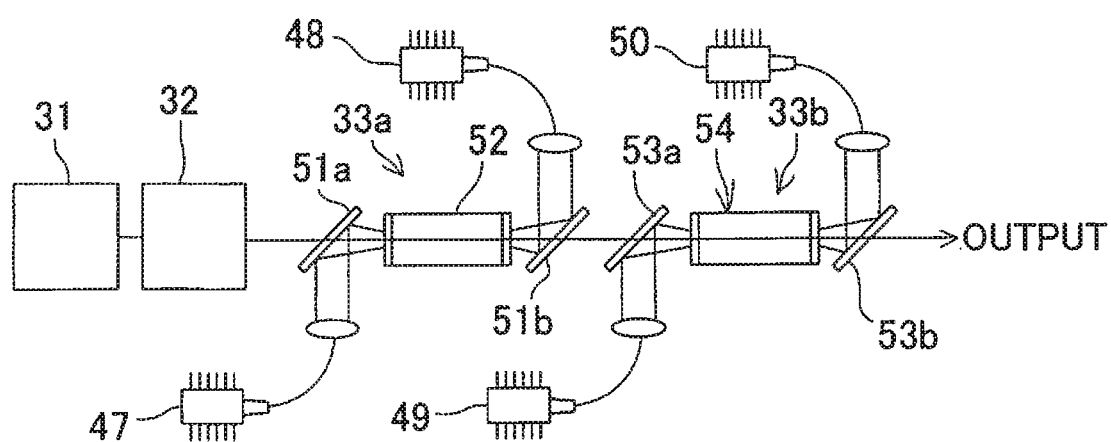
FIG. 9 is an explanatory drawing to show an MOPA type laser light source of a fourth example used in the present embodiment.

FIG. 9 shows a fourth example. The fourth example shows a case where, as optical amplifying elements of sub-optical amplifiers 33a and 33b, laser crystals 52 and 54 are used. Further, in the fourth example, two-stage amplifications are performed. Further, in FIG. 9, reference numerals 51a, 51b, 53a, and 53b denote dichroic mirrors as optical path coupling components.

In the fourth example, both the laser crystals 52 and 54 are designed as a bidirectional pump type.

A pump light from a laser light source for pumping 47 is entered the laser crystal 52 through the dichroic mirror 51a, and a pump light from a laser light source for pumping 48 is entered the laser crystal 52 through the dichroic mirror 51b.

A pump light from a laser light source for pumping 49 is entered the laser crystal 54 through the dichroic mirror 53a, and a pump light from a laser light source for pumping 50 is entered the laser crystal 52 through the dichroic mirror 53b.

It is to be noted that the configurations of the MOPA type laser light source as described above show a part of the examples, and it is needless to say that other various configurations can be considered.

The invention claimed is:

1. An MOPA type laser light source for laser scanner comprising: an oscillator control circuit, a main oscillator which tends to have poor beam quality as an output increases and to have a good beam quality as the output lowers, and has characteristics that the beam quality is not deteriorated even after an amplification, and an optical amplifier, wherein said oscillator control circuit has a measurement mode setting component, a repetition frequency setting component, a pulse peak output setting component, a pulse width setting component for setting a pulse width and an amplification factor calculating component, wherein said measurement mode setting component sets a measurement mode corresponding to a distance, wherein said repetition frequency setting component sets a repetition frequency corresponding to the measurement mode, wherein said oscillator control circuit sets the measurement mode in advance of measurement, and oscillates said main oscillator by a repetition frequency, a pulse peak output, and a pulse width corresponding to a set measurement mode, and wherein said amplification factor calculating component calculates an amplification factor based on the repetition frequency, the pulse peak output, and the pulse width and amplifies said optical amplifier based on a calculated amplification factor.

2. The MOPA type laser light source for laser scanner according to claim 1, wherein said optical amplifier has a plurality of sub-optical amplifiers and amplifies an optical pulse outputted from said main oscillator in a plurality of stages.

3. The MOPA type laser light source for laser scanner according to claim 1, wherein said optical amplifier includes a rare earth-added optical fiber as an optical amplifying element.

4. The MOPA type laser light source for laser scanner according to claim 1, wherein said optical amplifier includes a laser crystal as an optical amplifying element.

* * * * *